A. H. Carroll,

Picker.

No. 3,455. Reissued May 25. 1869.

Witnesses:
C. A. Pettit,
J. C. Kenon,

Inventor:
A. H. Carroll,
by Munn & Co.
Attorneys.

United States Patent Office.

ALBERT H. CARROLL, OF BALTIMORE, MARYLAND.

*Letters Patent No.* 88,845, *dated April* 13, 1869; *reissue No.* 3,455, *dated May* 25, 1869.

IMPROVEMENT IN PICKER FOR LOOMS.

The Schedule referred to in these Letters Patent and making part of the same.

*To all whom it may concern:*

Be it known that I, ALBERT H. CARROLL, of the city and county of Baltimore, and State of Maryland, have invented a new and improved Picker; and I do hereby declare that the following is a full, clear, and exact description of the construction and operation of the same, reference being had to the accompanying drawings, making a part of this specification, in which—

Figure 1:
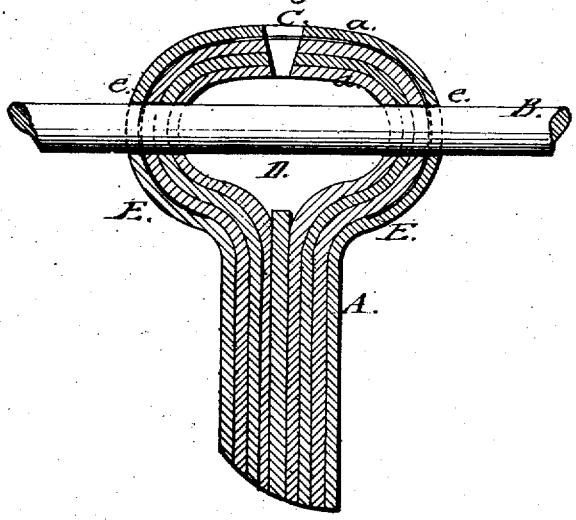
Figure 1 is a vertical section through the line *x x* of fig. 2.
Figure 2:
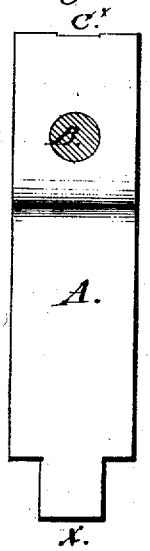
Figure 2 is a side view.

The object of this invention is to construct the picker in such a manner that it will keep the rod more constantly and uniformly lubricated than heretofore, and will not spatter the oil upon the cloth.

In the drawings—

A is the picker, running upon the rod B.

C is an oil-hole in the top of the picker, extending down to the central opening D.

E is a strip of cloth, felt, or other suitable substance, which will operate as a wick to receive the oil at the hole, or well C, and distribute it uniformly and continuously to the rod at its points of contact therewith, *e e*.

In fig. 1 this strip of fibrous material is represented by a greenish line, interposed between the two outer layers of the material of which the picker is composed. It may, however, be placed in any other convenient and suitable position for the performance of its peculiar function, above described, as, for instance, in a bed, or countersink in the outer or inner strip, shown at *a* and *a'*.

The advantages of this improvement in the construction of pickers are the following, viz:

First, economy in the use of oil, in that all oil placed in the picker is utilized.

Secondly, security in the work, in that none of the oil is carried or thrown upon the cloth or filling, as is often the case with the old pickers.

Thirdly, increased production, from the fact that the machinery will require less than one-sixth of the time for oiling required by the pickers heretofore in use; and Fourthly, a large saving in power, from the fact that the rod is constantly and uniformly lubricated.

Fifthly, saving in picker-strings, picker, and tug-straps.

I am aware that a picker has been made of cast-iron, with a chamber to contain lubricating-material; but I wish it distinctly understood that I lay no claim to such invention; but having fully described my invention, What I do claim, and desire to secure by Letters Patent, is—

A picker, constructed as shown in the drawings, and provided with a layer of cloth, felt, or other suitable material, all substantially as and for the purposes set forth.

To the above specification of my improvement, I have set my hand, this 20th day of April, 1869.

ALBERT H. CARROLL.

Witnesses:

CHAS. A. PETTIT,

SOLON C. KEMON.